(12) United States Patent
Kaplan et al.

(10) Patent No.: US 9,594,265 B2
(45) Date of Patent: Mar. 14, 2017

(54) OPTICAL ABSORBER

(71) Applicant: The University of Birmingham, Birmingham (GB)

(72) Inventors: Andrey Kaplan, Birmingham (GB); Dimitri Chekulaev, Birmingham (GB)

(73) Assignee: The University of Birmingham, Birmingham (GB)

( * ) Notice: Subject to any disclaimer, the term of this patent is extended or adjusted under 35 U.S.C. 154(b) by 0 days.

(21) Appl. No.: 14/646,883

(22) PCT Filed: Nov. 11, 2013

(86) PCT No.: PCT/GB2013/052954
§ 371 (c)(1),
(2) Date: May 22, 2015

(87) PCT Pub. No.: WO2014/083314
PCT Pub. Date: Jun. 5, 2014

(65) Prior Publication Data
US 2015/0301361 A1    Oct. 22, 2015

(30) Foreign Application Priority Data
Nov. 29, 2012   (GB) .................................. 1221521.6

(51) Int. Cl.
*G02F 1/03*     (2006.01)
*G02F 1/015*    (2006.01)
*G02F 1/01*     (2006.01)
*G02F 1/19*     (2006.01)
*B82Y 20/00*    (2011.01)

(52) U.S. Cl.
CPC ............ *G02F 1/015* (2013.01); *G02F 1/0126* (2013.01); *G02F 1/19* (2013.01); *B82Y 20/00* (2013.01); *G02F 2001/0156* (2013.01); *Y10S 977/932* (2013.01)

(58) Field of Classification Search
CPC .......... G02F 1/015; G02F 1/0126; G02F 1/19; G02F 2001/0156; B82Y 20/00; Y10S 977/932
USPC .................................. 359/244, 241, 240, 238
See application file for complete search history.

(56) References Cited

U.S. PATENT DOCUMENTS

| 4,872,744  | A  | 10/1989 | Abeles et al. |
| 7,973,696  | B2 | 7/2011  | Puscasu et al. |
| 8,643,532  | B1 | 2/2014  | Puscasu et al. |
| 9,007,687  | B2 | 4/2015  | Puscasu et al. |
| 2003/0202728 | A1 | 10/2003 | Leonard et al. |
| 2007/0171120 | A1 | 7/2007  | Puscasu et al. |

(Continued)

OTHER PUBLICATIONS

GB 1221521.6 Search Report, Mar. 8, 2013, The University of Birmingham.

(Continued)

*Primary Examiner* — Tuyen Tra
(74) *Attorney, Agent, or Firm* — Wells St. John P.S.

(57) ABSTRACT

The invention relates to an optical absorber comprising a semiconductor micro or nano scale structured array configured for transmission of electromagnetic (EM) radiation when in a passive state and for absorption and/or reflection of electromagnetic (EM) radiation when in an active state. The absorber also includes an activator arranged to inject free carriers into the structured array to activate said array on demand.

15 Claims, 6 Drawing Sheets

(56) References Cited

U.S. PATENT DOCUMENTS

2014/0111844 A1   4/2014  Puscasu et al.
2014/0224989 A1*  8/2014  Long .................... G02F 1/0126
                                                          250/338.4

OTHER PUBLICATIONS

WO 2007/070540 Full Reference, Jun. 21, 2007, Puscasu et al.
WO PCT/GB2013/052954 Search Report, Feb. 14, 2014, The University of Birmingham.
Chekulaev et al., "Diffusion-Free Ultrafast Carrier Dynamics in Silicon Nano-Pillars", (Feb. 5, 2009) Retrieved Online Feb. 11, 2014 at: http://arxiv.org/abs/0902.0939, 3 pages.
Chekulaev, "Experimental Study of Ultrafast Carrier Dynamics and Pasmons in Nanostructures", Thesis for the University of Birmingham Degree of Doctor of Philosophy, Feb. 1, 2012, United Kingdom, 146 pages.
Roger et al., "Enhanced Carrier-Carrier Interaction in Optically Pumped Hydrogenated Nanocrystalline Silicon", Applied Physics Letters vol. 101, No. 41, Oct. 1, 2012, United States, 4 pages.

* cited by examiner

OPTICAL ABSORBER

RELATED PATENT DATA

This application is a 35 U.S.C. §371 of and claims priority to PCT International Application No. PCT/GB2013/052954 which was filed on 11 Nov. 2013, and was published in English, and claims priority to GB Patent Application No. 1221521.6, which was filed on 29 Nov. 2012, the teachings of which are incorporated herein by reference.

FIELD OF THE INVENTION

The invention relates to an optical absorber. Particularly, but not exclusively, the invention relates to an optical absorber for an electro-optical modulator which may be employed in an infrared (IR) camera or sensor.

BACKGROUND TO THE INVENTION

Current IR imaging devices employ mechanical modulators to block incoming IR radiation by dropping a shutter. The purpose is often to enable background measurements to taken, which can be employed to enhance an IR image. However, the speed of such mechanical shutters is limited and the structure is typically bulky and noisy when in use.

There are also known attempts to provide modulators exploiting the Kerr effect, liquid crystals and acousto-optical characteristics. However, these are not widely implemented for the reasons explained below.

Kerr effect modulators are fast, but usually have bulky dimensions, a small aperture and require the application of high voltages. However, the major drawback with Kerr effect modulators is that they are birefringent.

For infrared light modulation an active layer consisting of liquid crystals must be relatively thick, corresponding to the wavelength to be absorbed. This results in poor response to applied pulses and a low extinction ratio. Almost all types of liquid crystals show slow response, narrow bandwidth and birefringence.

Acousto-optical modulators usually do not consume electrical power significantly and have good extinction ratio, but they are bulky in comparison to devices in microelectronics, have low bandwidth and relatively slow response in modulators with large apertures.

An aim of the present invention is therefore to provide an optical absorber which can be employed in an electro-optical modulator and which helps to address the above-mentioned problems.

SUMMARY OF THE INVENTION

According to a first aspect of the present invention there is provided an optical absorber comprising: a semiconductor micro or nano scale structured array configured for transmission of electromagnetic (EM) radiation when in a passive state and for absorption and/or reflection of electromagnetic (EM) radiation when in an active state; and an activator arranged to inject free carriers into the structured array to activate said array on demand.

Embodiments of the present invention therefore provide an optical absorber which can be activated-on-demand to switch between a passive transmitting state and an active absorbing state. Accordingly, the optical absorber may be configured as an anti-reflective coating (i.e. fully or substantially transparent) when passive and as a total or substantial absorber (i.e. light blocker or reflector) when active.

In other embodiments, the injection of free carriers can be controlled to alter the transparency of the array to a desired degree (e.g. to make it partially transparent and partially absorptive) to provide attenuation of a transmitted signal.

Advantageously, the optical absorber is based on proven physical principles and does not require complex fabrication technology or exotic materials. For example, it could be easily integrated into silicon devices. An optical absorber according to an embodiment of the present invention may be employed as an ultrafast shutter to block incoming radiation for a specified period of time.

According to a second aspect of the present invention there is provided an electro-optical modulator comprising the optical absorber according to the first aspect of the invention.

Due to the structure and operation of the optical absorber, electro-optical modulators according to the second aspect of the invention provide for significantly improved speed of operation, smaller dimensions and reduced noise, when compared to mechanical modulators at least. Modulators according to embodiments of the invention also have the potential to improve the speed and quality of an EM detection system and to enhance a signal to noise ratio. The modulation rate can be extremely fast or can be slow depending on the requirements of a particular application. Furthermore, modulation contrast can be extremely high without sacrificing efficiency.

The modulator may be configured to achieve up to a GHz repetition rate. Furthermore, modulators according to embodiments of the present invention (e.g. configured for a typically-sized uncooled IR sensor for a commercial camera) may have low power consumption (e.g. below 1 W) and can be optimised for improved performance and efficiency.

The optical absorber may be configured for transmission and/or absorption and/or reflection of EM radiation over a selected frequency bandwidth. In certain embodiments, the EM radiation comprises IR radiation. In other embodiments, the EM radiation comprises visible light. In particular embodiments, the optical absorber may be configured for transmission and/or absorption and/or reflection over a relatively narrow bandwidth (e.g. near, mid or far IR).

In certain embodiments, the optical absorber may be configured such that, when active, the array is substantially transparent at a first wavelength and substantially reflective at a second wavelength. In which case, the optical absorber may be employed as a beam splitter.

It will be understood that the dimensions and distribution of the structures in the array, in combination with the injection of free carriers and, optionally, the doping of the semiconductor material by donors or acceptors, can be tailored to provide a nearly transparent (passive) and/or strongly absorptive/reflective (active) optical response at a desired wavelength. More specifically, in an ideal case, the optical absorber may have a frequency response having a Lorentzian shape, with its centre in the frequency domain being determined by the concentration of injected free carriers and the width being determined by the scattering rate of the array. Both of these parameters are therefore tunable to some extent and, thus, the frequency response can be manipulated in terms of its position and shape.

The activator may comprise an electrical pump source or an optical pump source (e.g. a pump laser) configured to inject free carriers into the structured array. An advantage of embodiments of the present invention is the ability to quickly inject rather high carrier concentration into the structured array. This may lead to heating effects and temperature drift so a heat sink may be required.

The activator may be configured to inject free carriers into the structured array at a concentration which results in absorption and/or reflection over a desired range of wavelengths.

The structured array may exploit the Free Carrier Absorption (FCA) effect to turn the array into an absorber/reflector when activated. Accordingly, the material chosen for fabrication of the structured array will desirably have a strong FCA effect.

The structured array may comprise a plurality of nanopillars or the like. More specifically, the structured array may comprise square, rectangular or triangular cross-section posts or cylindrical poles having a rounded, pointed or flat top. In certain embodiments the structured array may comprise pyramids or frusto-pyramidal structures, cones or frusto-conical structures.

The structured array may be configured for optimal activation. For example, the structured array may be configured as a 2D photonic crystal with maximum absorption at the wavelength of a pump source so as to reduce power consumption of the pump source.

Moreover, the shapes of the structures may be configured for an optimal response to incoming radiation. In which case, the structures may be part-spherical or hemispherical so that the optical path through each structure does not depend on an angle of incidence.

The structured array may be provided on one side or on both sides of a supporting substrate. The substrate may comprise a single layer or a multilayer structure. The substrate desirably has no absorption at the wavelength of an optical pump (when employed) or at the wavelength of incoming radiation intended for transmission and absorption/reflection by the array.

The structured array may be fabricated from organic or inorganic semiconductor material—for example, silicon or germanium.

According to a third aspect of the present invention there is provided an optoelectronic device comprising the electro-optical modulator according to the second aspect of the invention.

The optoelectronic device may be configured as a camera or sensor including a detector. The electro-optical modulator may be provided to form an active layer in front of the detector to block EM radiation (e.g. IR radiation) when activated.

The optoelectronic device may be configured for use in signal detection; gated signal detection; filters; spectral pulse shaping; tuned IR emitters; 3D topography imaging; position and/or speed detection; reconnaissance, surveillance and target acquisition technology; optical thermal imaging (e.g. to identify objects in the dark or in difficult environments such as smoke or fog); industrial process control; pyrometers; or vision enhancement for automotive, aviation or seafaring applications. Thus, the optoelectronic device may be configured for use by, for example, fire-fighters, law enforcement officers, emergency personnel, border patrol, coast guards, rescue teams, security guards, maintenance engineers, building inspectors or military personnel.

More specifically, an optoelectronic device according to an embodiment of the invention may be configured for shortwave or near IR use (e.g. wavelengths of approximately 0.7 to 5 microns) and may be employed in active vision enhancement (e.g. where an IR light source is employed), high temperature thermography or material analysis. An optoelectronic device according to another embodiment of the invention may be configured for medium wave or mid IR use (e.g. wavelengths of approximately 5 to 40 microns) and may be employed in thermography, passive vision enhancement (e.g. night vision) or material analysis. An optoelectronic device according to a further embodiment of the invention may be configured for long wave or far IR use (e.g. wavelengths of approximately 40 to 350 microns) and may be employed in thermography or passive vision enhancement.

BRIEF DESCRIPTION OF THE DRAWINGS

Certain embodiments of the present invention will now be described with reference to the accompanying drawings in which.

DETAILED DESCRIPTION OF CERTAIN EMBODIMENTS

Figure 1:
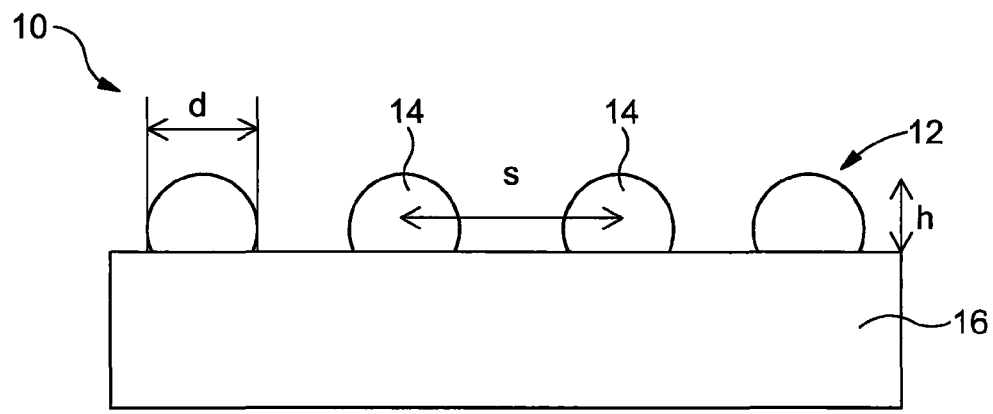
FIG. 1 shows a schematic side view of an array for an optical absorber according to a first embodiment of the present invention.

With reference to FIG. 1 there is shown a portion of an optical absorber 10 according to a first embodiment of the present invention. The optical absorber 10 comprises a two dimensional (2D) array 12 of nano-scale semiconductor structures 14 configured for transmission of IR radiation when in a passive state and for absorption and reflection of IR radiation when in an active state, as will be explained in more detail below. The optical absorber 10 also comprises an activator (shown in FIG. 4 and discussed below) which is arranged to inject free carriers into the array 12 to activate the array 12 on demand.

In the embodiment of FIG. 1, the structures 14 are part-spherical semiconductor (e.g. $SiO_2$) nanopillars fabricated on one side of an IR transparent semiconductor (e.g. silicon) substrate 16. The structures 14 have a diameter, d, a height, h, and a separation, s, between their respective centres.

Figure 2:
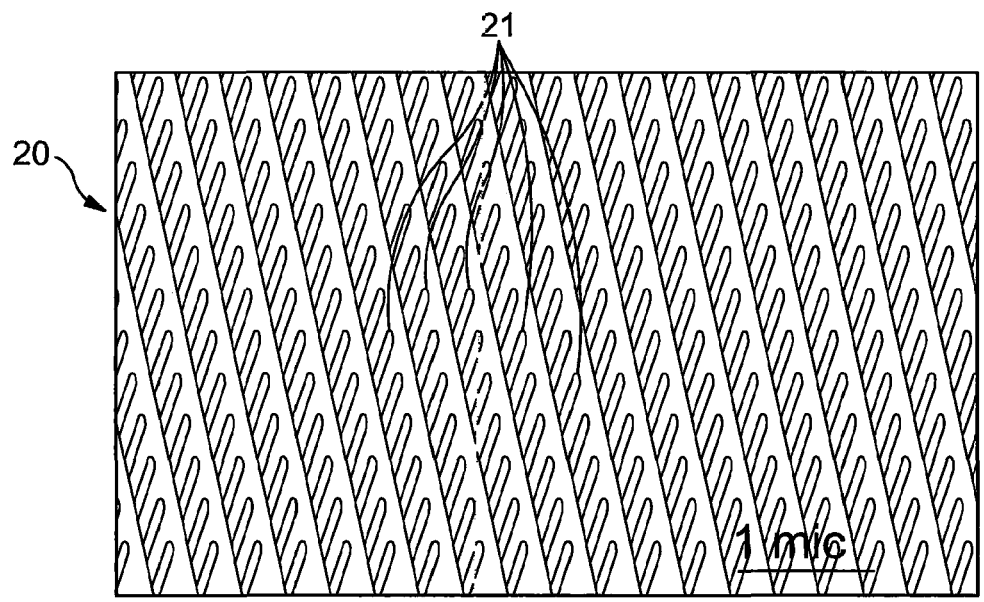
FIG. 2 shows a partial top perspective image of an array for an optical absorber according to a second embodiment of the present invention.

FIG. 2 shows a top SEM image of a portion of an optical absorber 20 which is similar to that shown in FIG. 1 but wherein the structures 21 are in the form of cylindrical nanopillars having substantially flat top surfaces (parallel to the plane of the substrate) and where d=70 nm, h=180 nm and s=250 nm.

Operational Theory

A 2D array of nanopillars or other inclusions hosted in a matrix material (or of holes surrounded by a matrix material; or a structure made of one kind of material and surrounded by a matrix made of another material) exhibits an effective dielectric function, $\epsilon_{eff}$, given by Equation (1) below.

$$\epsilon_{eff} = \epsilon_m + \frac{2f\epsilon_m(\epsilon_i^0 - \epsilon_m)}{\epsilon_i^0 + \epsilon_m - f(\epsilon_i^0 - \epsilon_m)} \quad (1)$$

In which case, $\epsilon_m$ represents the dielectric function of the matrix material, $\epsilon_i^0$ represents the dielectric function of inclusions and f represents a volume fraction of the inclusions.

It is well-known that as $\epsilon_i \rightarrow -\epsilon_m$ such structures show so-called plasmonic resonance; that is incoming light is efficiently coupled into the inclusions and is absorbed if the imaginary part of $\epsilon_i$ has a finite value (i.e. if the incoming light matches the excited plasma frequencies of the free carriers). However, the conditions giving rise to the plasmonic resonance are unique and the properties of the inclusions need to be designed to support its existence.

Assuming that $\epsilon_i^0$ is a fundamental property of a material, one may alter its value by, for example, changing temperature, applying pressure or an electrical field, or by populating with the free carriers. For reasons of speed and controllability, the last method is adopted in relation to the present invention.

Introducing free carriers into the inclusions will change the dielectric function, $\epsilon_i^0$, according to the Drude-optical response model of Equation (2), where N is the carrier concentration, m is the mass of the carrier (reduced mass of holes and electrons), w is frequency of light, $\gamma$ is the scattering rate and e is the charge of an electron.

$$\epsilon_i = \epsilon_i^0 - \frac{Ne^2}{m\epsilon_0} \frac{1}{\omega^2 + i\gamma\omega} \quad (2)$$

By substituting $\epsilon_i$ given by Equation (2) into Equation (1) in place of $\epsilon_i^0$, one can see that changing carrier concentration alters the dielectric function of the inclusions and the condition of plasmonic resonance can be achieved. It is also apparent that such resonance has a frequency response different from that observed on a surface of bulk materials, thin films and gratings. In an ideal case, the frequency response has a Lorentzian shape with its centre in the frequency domain being determined by the level of carrier pumping, N, and the width determined by the scattering rate, $\gamma$. Both of these parameters are therefore tunable to some extent and, thus, the resonance can be manipulated in terms of its position and shape.

The following are different ways to achieve the resonance at a desired wavelength by manipulating the carrier concentration, N:

1. A semiconductor structure can be doped with donors or acceptors to provide a desired concentration of free carriers.
2. The free carriers can be injected via electrical contacts to an external electric current source.
3. The free carriers can be excited optically using an external light source.

The first method described above (which is related to but does not form a part of the present invention) can be regarded as a rigid one because once the structure has been fabricated with predesigned (doping) properties no further changes can be easily made. However such a structure could be employed as an absorption filter operating passively at a fixed wavelength, spectral width and desired transparency.

The second and third methods described above relate to specific embodiments of the present invention and are more flexible though more resource-demanding. In these instances the structure can be devised in such a way that it appears almost transparent when the free carriers are not pumped in. However, with controlled carrier injection the level of transparency can be altered to a desired degree. Thus, such a structure can be activated on demand by pumping in free carriers by applying optical or electrical pulses. It is therefore possible to create a structure (e.g. a filter) which is substantially transparent without injected carriers, but after the injection it will appear almost totally absorptive (i.e. opaque) or reflective in the desired wavelength range.

Referring back to FIGS. 1 and 2, the distance, s, between the individual structures 14/21 and their diameter, d, defines the volume fraction, f, which is critical in determining the effective dielectric function $\epsilon_{eff}$ from Equation (1). In addition, the product of the height, h, of the structures 14/21 and $\epsilon_{eff}$ defines the optical thickness of the array 12. Thus, a specific combination of these parameters can be chosen in order that the array 12 effectively becomes an antireflection coating and the optical absorber 10/20 has a maximum transparency, as shown in FIG. 3 where IR radiation 30 is permitted to pass straight through the passive optical absorber 20.

Figure 3:
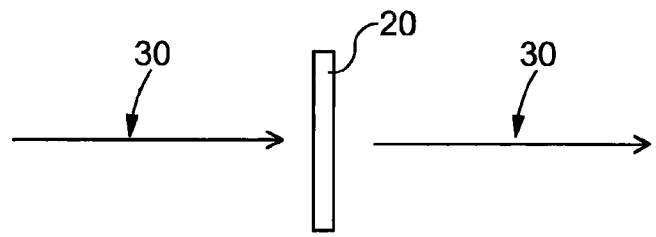
FIG. 3 shows a schematic end view of the optical absorber array of FIG. 2 when in a passive transmission state.
Figure 4:
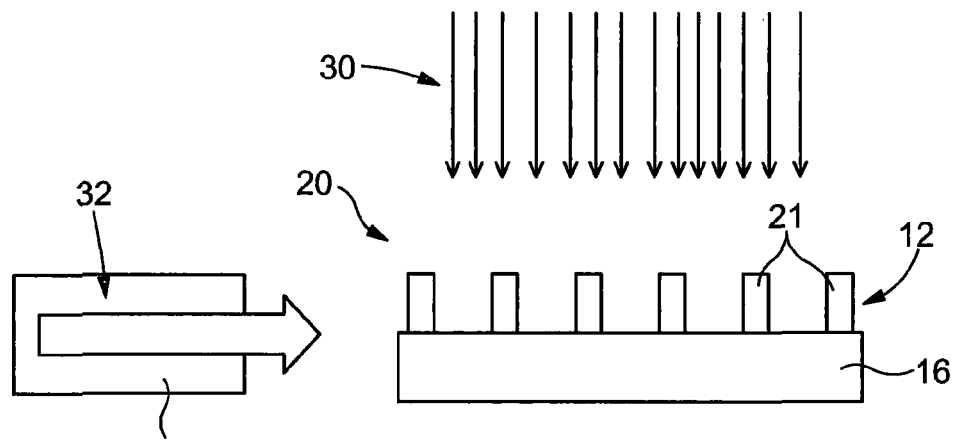
FIG. 4 shows an enlarged schematic side view of the optical absorber array of FIG. 3 when being injected with free carriers from an optical pump activator.

FIG. 4 shows an enlarged schematic side view of the optical absorber 20 of FIG. 3 when being injected with free carriers via pump light 32 from an optical pump activator 33. The role of optical pumping is to excite electrons to a higher energy level whereupon they serve as free carriers. The wavelength of the pump light 32 will be pre-selected in such a way that the pump light 32 is efficiently absorbed by the structures 21 according to the properties of the material they are made of and their arrangement in the array 12, which constitutes a 2D photonic crystal structure. Applying a pulse of the pump light 32 will create enough free carriers to achieve the plasmonic resonance conditions described above and thereby switch the structure from maximum transparency to an absorptive or reflective state (or in other embodiments to any state in-between).

Figure 5:
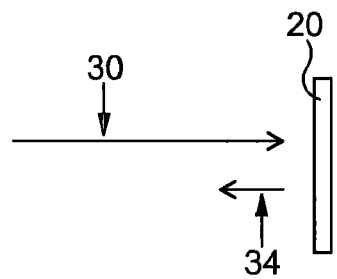
FIG. 5 shows a schematic end view of the optical absorber array of FIG. 3 when injected with free carriers as per FIG. 4 such that it is in an active absorbing and reflecting state.

FIG. 5 shows a schematic end view of the optical absorber 20 when injected with free carriers in accordance with FIG. 4 such that the optical absorber 20 is in an active absorbing state and a proportion of the incoming IR radiation 30 is reflected via beam 34 but no IR radiation is transmitted.

Figure 6:
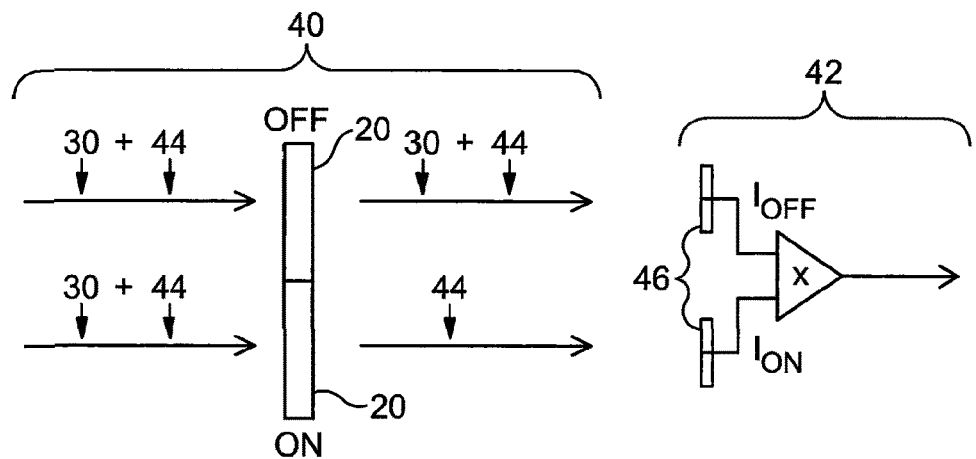
FIG. 6 shows a schematic end view illustrating how the optical absorber array of FIGS. 2 to 5 can be employed in a modulator to remove background radiation in order to produce a high quality image.

FIG. 6 shows a schematic end view illustrating the optical absorber 20 of FIGS. 2 to 5 operated as a modulator 40 in a pulsed mode used to remove background radiation in order to produce a high quality IR image via signal processing apparatus 42. It will be understood that in FIG. 6 two optical absorbers 20 are shown side-by-side simply to illustrate the consecutive OFF (transparent) and ON (absorbing) states which a single optical absorber 20 will operate in, when pumped by a series of optical pulses, as illustrated in FIG. 4.

It can therefore be seen that when the optical absorber 20 is OFF, an incoming IR signal 30 will be transmitted through the optical absorber 20 along with background radiation 44. However, when the optical absorber 20 is modulated to ON (via fast optical pumping), the incoming IR radiation is absorbed and only the background radiation 44, at other wavelengths, will pass through the optical absorber 20. In both cases, the transmitted signals will be received at a photo-detector 46 and will be converted into intensity profiles, $I_{OFF}$ and $I_{ON}$. By subtracting $I_{ON}$ from $I_{OFF}$ the background radiation 44 can be removed leaving the IR signal 30 of interest to produce an image. Using this technique a detected signal 30 may have a signal strength of just a few percent of the background radiation 44 and the speed of modulation by the modulator 40 will enable detection of a relatively clean signal.

Figure 7:
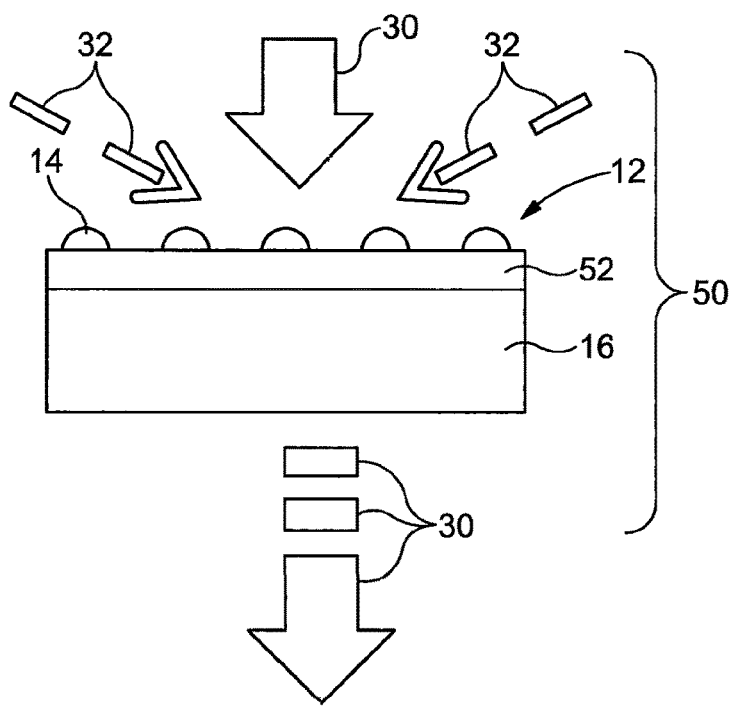
FIG. 7 shows a schematic view of the optical absorber array of FIG. 1 when actively employed in a modulator.

FIG. 7 shows a schematic view of the optical absorber 10 of FIG. 1 when actively employed in a modulator 50. Note, in this embodiment, the optical absorber 10 comprises an intermediate layer 52, made of an insulator transparent for IR radiation, between the Si substrate 16 and the part-spherical semiconductor (e.g. $SiO_2$) structures 14. The role of the intermediate layer 52 is to enhance absorption of the structures 14 by matching the phases of light rays reflected from interfaces and to prevent escape of the free carriers to the substrate 16.

As illustrated, the optical absorber 10 is illuminated by a continuous wave of IR radiation 30 and by a train of pulses 32 from a visible light pump source (not shown). As explained above, the pulses 32 from the pump source will create a concentration of free carriers in the structures 14. Consequently, the response of the optical absorber 10 will be modulated between nearly full transparency and substantially total absorption of the incoming IR radiation, in response to the pumped pulses 32.

Depending on the fabrication material selected for the structures 14, 21, the modulated response of the optical absorber 10 can achieve the terahertz regime. The modulators 40, 50 are therefore ideal for signal detection applications and can be employed to replace mechanical choppers in far IR pyrometers, for example.

Figure 8:
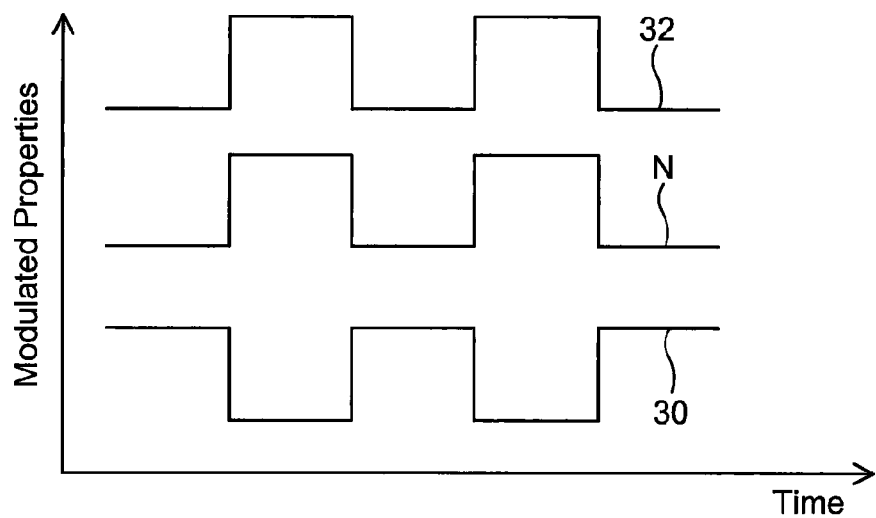
FIG. 8 shows a graph illustrating the timing of the pump modulation in FIG. 7 and the corresponding carrier concentration and transmission.

FIG. 8 shows a graph illustrating the timing of the pump pulse modulation 32 employed in FIG. 7 and the corresponding carrier concentration N and IR transmission 30. Thus, the waveform 32 associated with the pump source creates a similar response of the free carrier concentration N in the structures 14 and this results in the IR transmission 30 also being modulated in similar manner, although when the pump pulse 32 and carrier concentration N are both high, the IR transmission 30 is low (i.e. the optical absorber 10 is absorbing) and vice versa.

Figure 9:
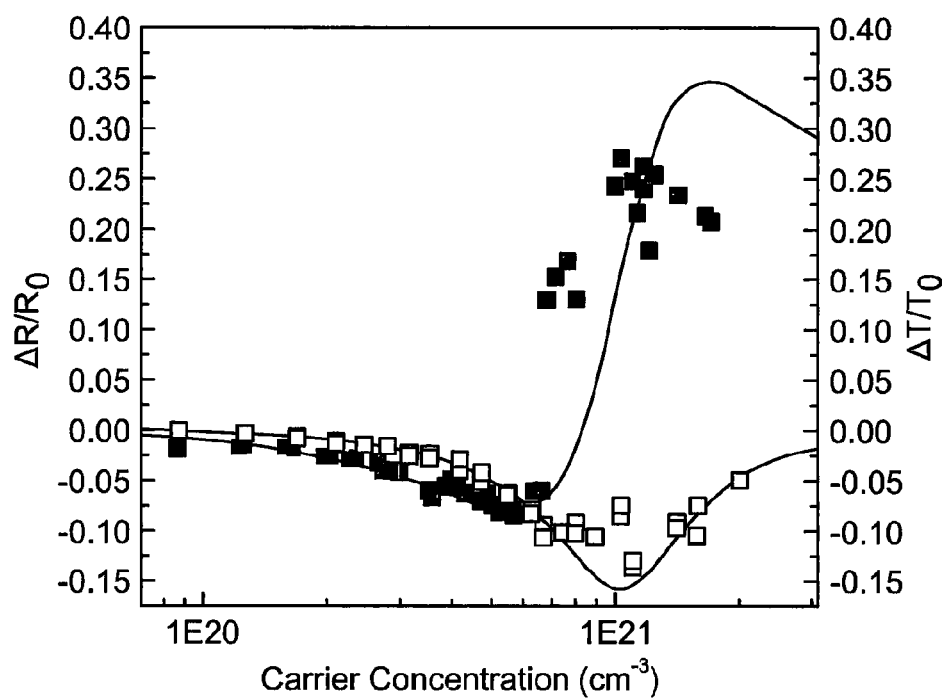
FIG. 9 shows graphs illustrating the change in reflectivity and transmission as a function of carrier concentration as measured in relation to the optical absorber array of FIG. 2, when using 800 nm pump and 800 nm probe beams.

FIG. 9 shows graphs illustrating the change in reflectivity ($\Delta R/R_0$) and transmission ($\Delta T/T_0$) as a function of carrier concentration N for the optical absorber 20 of FIG. 2, at a wavelength of 800 nm. The full and open squares represent, respectively, the experimental reflectivity and transmission while the solid lines show the calculated reflectivity and transmission according to the Drude model. Thus, it can be seen that the experimental results correspond well with the model. Furthermore, the reflectivity is dramatically increased and the transmission is decreased, when the carrier concentration is in the range $8 \times 10^{20}$ and $2 \times 10^{21}$ cm$^{-3}$.

Figure 10:
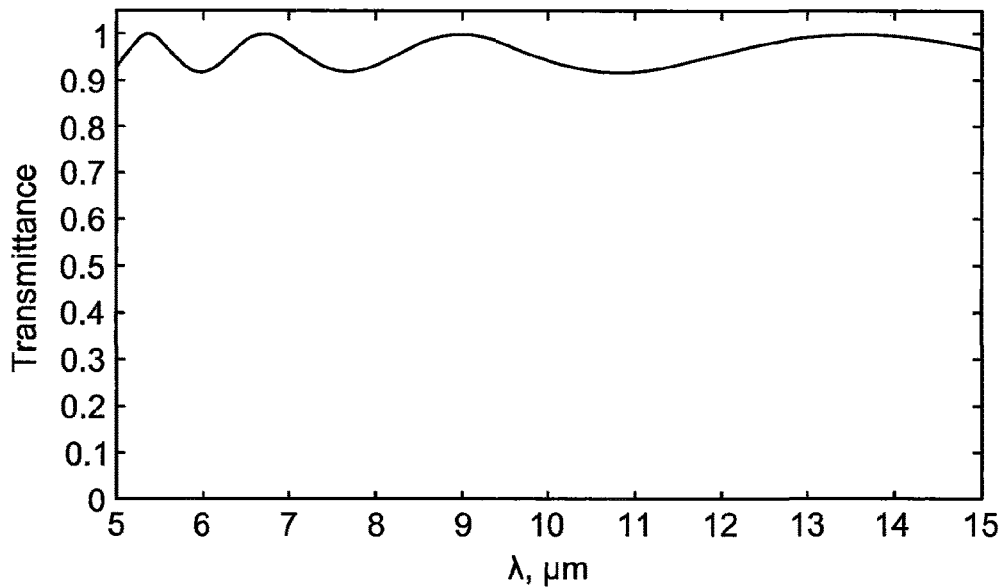
FIG. 10 shows calculated transmittance as a function of wavelength for the optical absorber array of FIG. 2 when in a passive state.

FIG. 10 shows calculated transmittance as a function of wavelength in the far IR regime for the optical absorber 20 of FIG. 2 when in a passive state (see FIG. 3). In this case, the structures 21 have the following properties: d=1 micron, s=3 microns and h=6.5 microns. Thus, the optical absorber 20 is almost fully transparent when not activated.

Figure 11:
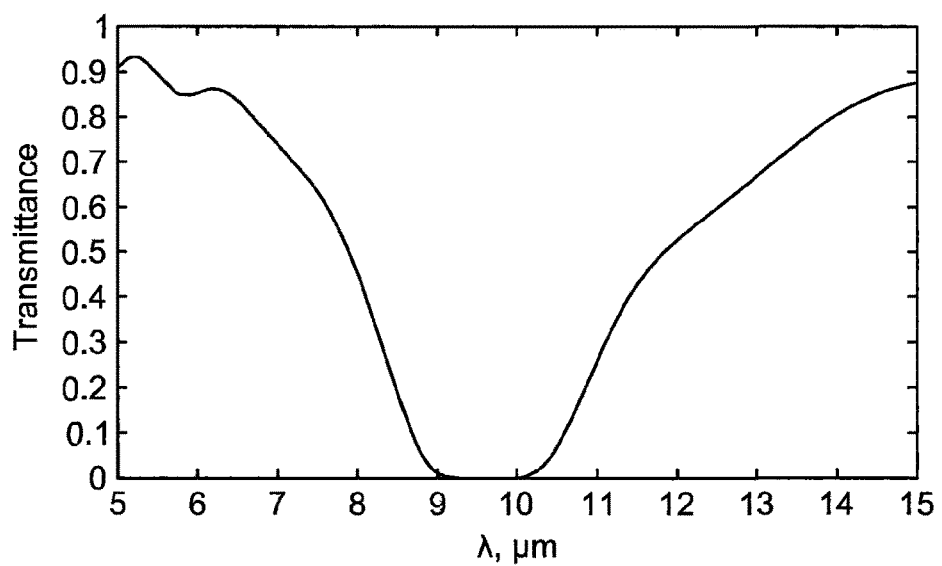
FIG. 11 shows calculated transmittance as a function of wavelength for the optical absorber array of FIG. 2 when in an active state.

FIG. 11 shows calculated transmittance as a function of wavelength in the far IR regime for the optical absorber 20 of FIG. 2 when in an active state (see FIG. 5). In this case, the optical absorber 20 is optically pumped with free carriers to a concentration of $N=10^{19}$ cm$^{-3}$. Thus, when activated, the optical absorber 20 operates as a band absorptive filter, optimised for thermal imaging.

Figure 12:
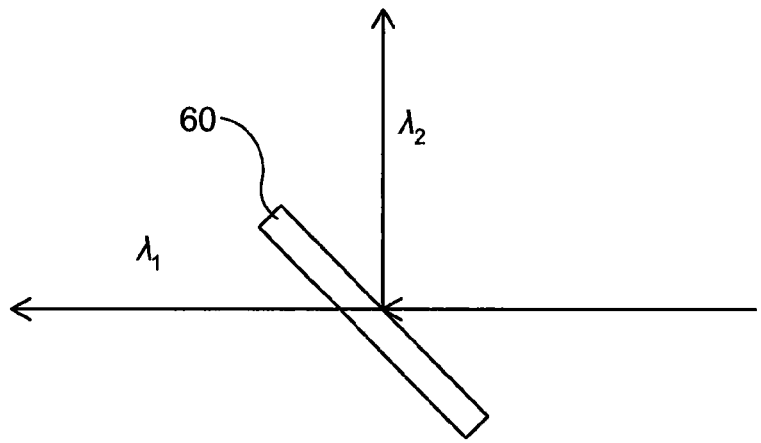
FIG. 12 shows a schematic of an optical absorber array employed as a beam splitter in accordance with an embodiment of the invention.

FIG. 12 shows a schematic of an optical absorber 60 employed as a beam splitter in accordance with an embodiment of the invention. Although not shown, the structure of the optical absorber 60 is similar to that shown in FIG. 1. In this case, the optical absorber 60 is designed such it is substantially transparent at a first wavelength, $\lambda_1$, but strongly reflective at a second wavelength, $\lambda_2$. Thus, optical absorber 60 can be employed, for example, as a beam splitter to split an incoming signal for the measurement of the intensity ratio at these two wavelengths.

Figure 13:
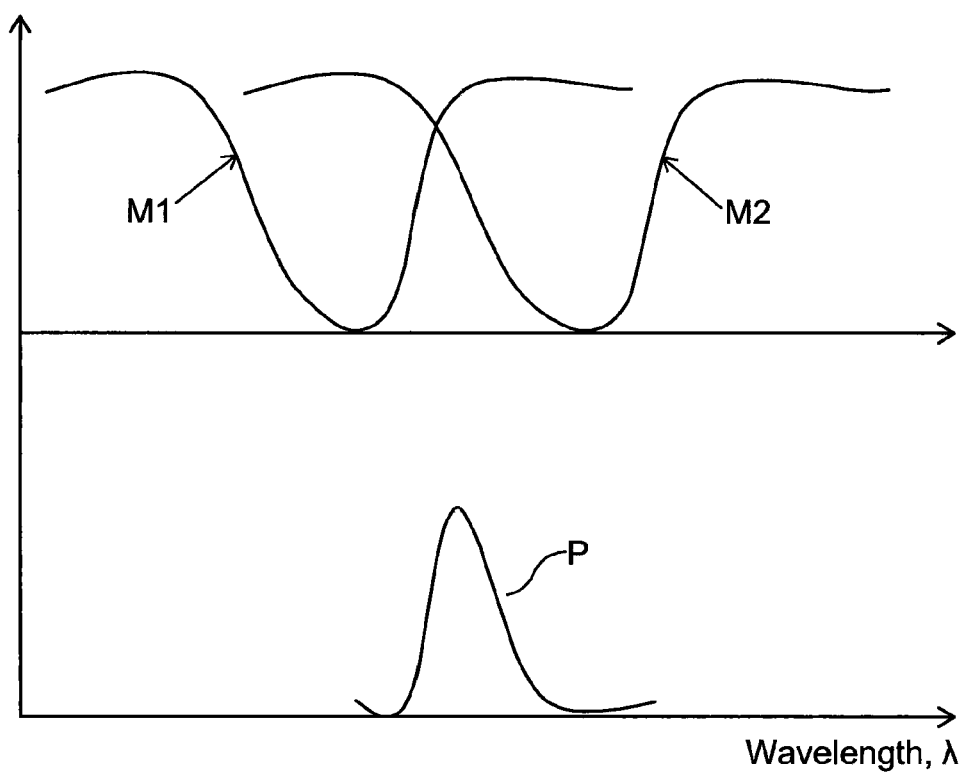
FIG. 13 shows a graph illustrating the timing of two independently controlled modulators arranged to provide a spectral pulse shaper according to an embodiment of the invention.

FIG. 13 shows a graph illustrating the timing of two independently controlled modulators M1 and M2 (e.g. as described above in relation to FIG. 7), which are arranged to provide a resulting pulse shape, P, in a spectral pulse shaper according to an embodiment of the invention. It will be noted that a set of two or more independently controlled modulators can be employed as a spectral pulse shaper if deployed in conjunction with a black body radiation source (for example, a low cost thermal IR emitter) and a resulting low cost tuned IR emitter can be implemented in, for example, a gas detection sensor. Currently, low cost gas detectors are designed to work at specific wavelengths, resulting in detection of specific gases only (for example, CO). Advantages of the proposed application, utilising modulators according to embodiments of the present invention are: multi-element detection (where several gases can be detected by one device); and a tunability option (where wavelength tuning or selection of desired gases to be detected can be configured onsite by an end user).

A further application of a modulator according to an embodiment of the present invention is in gated signal detection. In this case, the modulator will be synchronised with an external source of pulsed radiation. More specifically, an external source sends a pulse to a distant object at a certain wavelength and the modulator receives a trigger signal indicating that the pulse has been sent. After some time, $t_1$, the modulator is opened (i.e. gated) for a short time, $t_2$, to pass through the pulse after it has been reflected from the distant object, rejecting wavelengths not corresponding to the wavelength of the external source. In this way the distance, l, to an object can be determined according to $l=c \cdot t_1$, where c is the speed of light. The resolution of such a measurement will be determined by $t_2$ and the use of such gated signal detection can be employed to determine not only the position, but also the topography and speed of an object.

It will be appreciated by persons skilled in the art that various modifications may be made to the above-described embodiments without departing from the scope of the present invention. In particular, features described in relation to one embodiment may be incorporated into other embodiments also.

The invention claimed is:

1. An optical absorber comprising:
   a semiconductor micro or nano scale structured array configured for transmission of infrared electromagnetic (EM) radiation when in a passive state and for absorption and/or reflection of electromagnetic (EM) radiation when in an active state; and
   an activator arranged to inject free carriers into the structured array to achieve plasmonic resonance conditions, thereby to activate said array on demand.

2. The optical absorber according to claim 1 wherein the activator comprises an optical pump source configured to inject free carriers into the structured array.

3. The optical absorber according to claim 1 wherein the activator comprises an electrical pump source configured to inject free carriers into the structured array.

4. The optical absorber according to claim 1 wherein the structured array exploits the Free Carrier Absorption (FCA) effect to turn the array into an absorber and/or reflector when activated.

5. The optical absorber according to claim 1 wherein the structured array comprises a plurality of nanopillars.

6. The optical absorber according to claim 5 wherein the structured array comprises square, rectangular or triangular cross-section posts or cylindrical poles having a rounded, pointed or flat top.

7. The optical absorber according to claim 5 wherein the structured array comprises pyramids or frusto-pyramidal structures, cones or frusto-conical structures.

8. The optical absorber according to claim 5 wherein the structured array comprises part-spherical or hemispherical structures.

9. The optical absorber according to claim 1 wherein the activator is configured to inject free carriers into the structured array at a concentration which results in absorption and/or reflection over a desired range of wavelengths.

10. The optical absorber according to claim 1 configured such that, when active, the array is substantially transparent at a first wavelength and substantially reflective at a second wavelength.

11. The optical absorber according to claim 1 wherein the structured array is provided on one side or on both sides of a supporting substrate and wherein the substrate is transparent at the wavelength of the EM radiation intended for transmission and/or absorption and/or reflection by the array.

12. An electro-optical modulator comprising the optical absorber according to claim 1.

13. An optoelectronic device comprising the electro-optical modulator according to claim 12.

14. The optoelectronic device according to claim 13, configured as a camera or sensor.

15. A semiconductor micro or nano scale structured array for the optical absorber of claim 1.

* * * * *